United States Patent
Valant

(10) Patent No.: US 12,202,727 B2
(45) Date of Patent: Jan. 21, 2025

(54) PROCESS FOR THE PRODUCTION OF HYDROGEN BY MEANS OF THERMAL ENERGY

(71) Applicant: ECUBES d.o.o., Nova Gorica (SI)

(72) Inventor: Matjaž Valant, Ljubljana (SI)

(73) Assignee: ECUBES d.o.o., Nova Gorica (SI)

( * ) Notice: Subject to any disclaimer, the term of this patent is extended or adjusted under 35 U.S.C. 154(b) by 676 days.

(21) Appl. No.: 17/423,454

(22) PCT Filed: Jun. 18, 2021

(86) PCT No.: PCT/IB2021/055384
§ 371 (c)(1),
(2) Date: Jul. 15, 2021

(87) PCT Pub. No.: WO2022/106911
PCT Pub. Date: May 27, 2022

(65) Prior Publication Data
US 2022/0340418 A1    Oct. 27, 2022

(30) Foreign Application Priority Data

Nov. 20, 2020    (SI) .............................. P 2020 0 0213

(51) Int. Cl.
*C01B 3/08*     (2006.01)
(52) U.S. Cl.
CPC ........ *C01B 3/08* (2013.01); *C01B 2203/0805* (2013.01)
(58) Field of Classification Search
CPC .... C01B 3/08; C01B 2203/0805; Y02E 60/36
See application file for complete search history.

(56) References Cited

U.S. PATENT DOCUMENTS

| 2,954,274 A | 9/1960 | Walsh |
| 3,842,164 A | 10/1974 | Wentorf |

(Continued)

FOREIGN PATENT DOCUMENTS

| GB | 1 486 053 A | 9/1977 |
| JP | 2008529955 A | 8/2008 |

(Continued)

OTHER PUBLICATIONS

International Search Report issued in PCT/IB2021/055384; mailed Oct. 11, 2021.

(Continued)

*Primary Examiner* — Wayne A Langel
*Assistant Examiner* — Syed T Iqbal
(74) *Attorney, Agent, or Firm* — Studebaker & Brackett PC

(57) ABSTRACT

A process for the production of hydrogen by thermal energy based on a closed metal-chloride material cycle, where in the hydrogen release segment the metal is oxidized with hydrochloric acid at room temperature and in the regeneration segment the metal ions are reduced by heat treatment. This is a closed-cycle technological material flow, carried out by use of thermal energy and enables the production of hydrogen at room temperature on the basis of a solid energy carrier represented by metals. The process includes three main technological segments: an oxidation segment in which oxidation of a hydrogen-releasing metal is performed, a regeneration segment in which metal ions are reduced for metal regeneration, and a gaseous HCl capture segment in which gaseous HCl is dissolved in water. The material cycle is closed; there are no emissions or waste. Only water enters the process while hydrogen and oxygen exit.

14 Claims, 3 Drawing Sheets

(56) References Cited

U.S. PATENT DOCUMENTS

Figure 1:
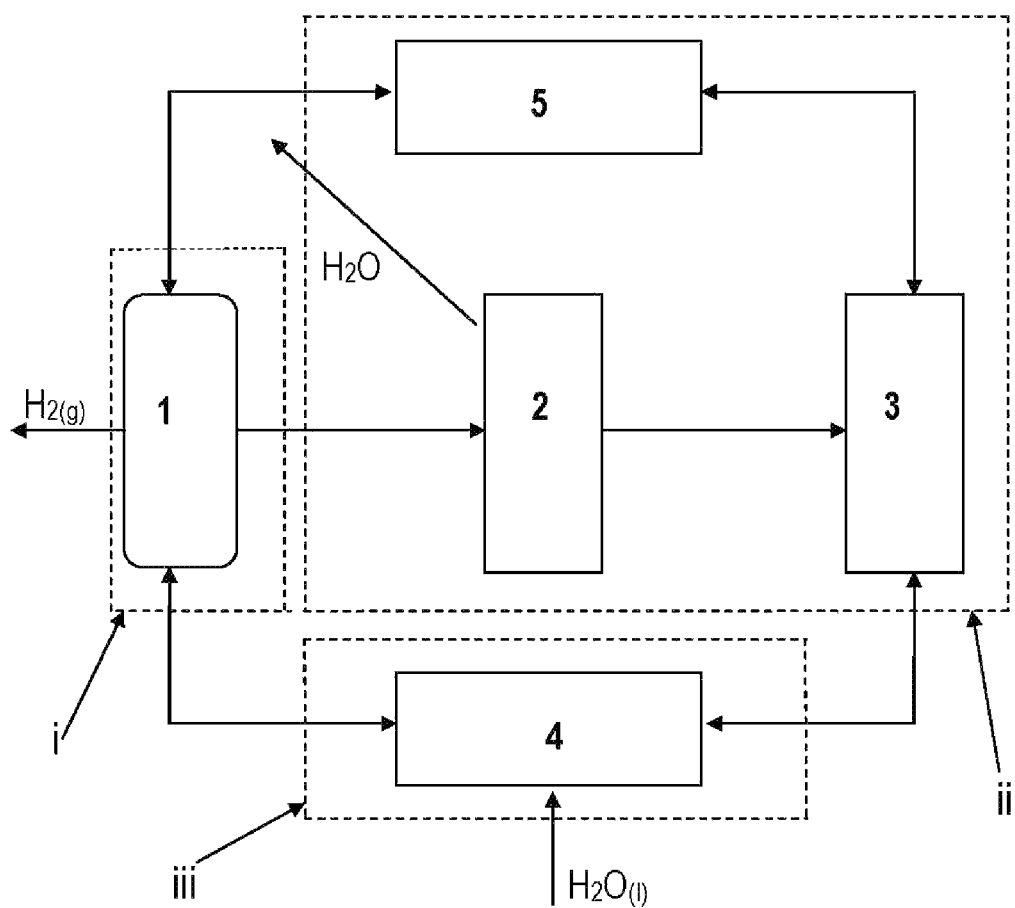

| | | | |
|---|---|---|---|
| 3,998,942 A | 12/1976 | Pangborn et al. | |
| 4,024,230 A | 5/1977 | Knoche et al. | |
| 4,039,651 A | 8/1977 | Knoche et al. | |
| 4,842,844 A | 6/1989 | Harris et al. | |
| 2005/0042150 A1* | 2/2005 | Griffin | C01B 3/08 422/139 |
| 2010/0172805 A1 | 7/2010 | Kamitani | |

FOREIGN PATENT DOCUMENTS

| | | | |
|---|---|---|---|
| JP | 6330715 B2 | 5/2018 |
| SI | 25573 A | 6/2019 |

OTHER PUBLICATIONS

Written Opinion issued in PCT/IB2021/055384; mailed Oct. 11, 2021.

Canavesio et al., Evaluation of an iron-chlorine thermochemical cycle for hydrogen production, Int. J. Hydrogen Production, 40 (2015), pp. 8620-8632.

International Preliminary Report on Patentability issued in PCT/IB2021/055384; mailed Feb. 28, 2023.

\* cited by examiner

PROCESS FOR THE PRODUCTION OF HYDROGEN BY MEANS OF THERMAL ENERGY

FIELD OF INVENTION

The present invention relates to a process for the production of hydrogen by means of thermal energy based on a closed metal-chloride material cycle, where in the hydrogen release segment the metal is oxidized with hydrochloric acid at room temperature and in the regeneration segment the metal ions are reduced by heat treatment.

PRIOR ART AND TECHNICAL PROBLEM

Hydrogen is an important technological raw material and also a carbon-free pure energy carrier that gives water and releases thermal energy in combustion. When used in fuel cells, it can also release electricity through the oxidation process. Free hydrogen is not present in nature, so different technologies and chemical processes to produce it had to be developed. Most of the hydrogen used nowadays, as much as 95%, is produced by steam reforming of oil, coal or natural gas. Carbon dioxide is evolved in this process, so the hydrogen thus produced cannot be considered carbon-free. The share is so high because this technology provides significantly cheaper hydrogen than the technologies that can be considered carbon-free.

Almost all the remaining hydrogen, i.e. almost 5% of total world consumption, is produced by electrolysis of water. The process is carried out by conducting the electrolysis of water with the help of electricity, whereby oxygen and hydrogen are formed. Hydrogen has a very low volume energy density, so it is mostly stored compressed or liquefied, which is an energy-intensive process. In addition, due to its high diffusivity, hydrogen leaks through the walls of storage tanks, which again reduces the energy efficiency during longer storage of hydrogen. The chemical energy of hydrogen is converted into electrical energy in fuel cells, into thermal energy by direct combustion, or into mechanical energy in hydrogen turbines.

Important technologies for the production of carbon-free hydrogen include thermochemical water splitting cyclic processes. In these processes, energy is stored and released through oxidation-reduction processes associated with various valence states of mostly metal, halogen or chalcogenide ions. These processes mainly operate at high temperatures (500-2000° C.), during which a series of chemical reactions take place, one of the products of which is hydrogen. The raw materials used in this process are regenerated and reused in the next cycle, forming a material flow, into which only water enters while hydrogen and oxygen exit. Sufficient thermal energy required for such processes can be obtained, for example, by concentrating sunlight, using excess industrial heat or electric heating.

Examples of oxidation-reduction conversions in such thermochemical cyclic processes where hydrogen develops are, for example, FeO to $Fe_3O_4$, HI to $I_2$, $CrCl_2$ to $CrCl_3$, Cu to $Cu_2S$, CuCl to $CuCl_2$, $MnCl_2$ to $Mn_3O_4$, $SO_2$ to $SO_3$, Sn to $Sn_2$. Iron chloride cycles are also described, in which oxidation-reduction conversion occurs between $FeCl_2$ and $FeCl_3$, between different iron oxides or between metallic iron and oxides. All reactions from this type of thermochemical cycles in which hydrogen is released are performed at high temperatures, usually above 500° C.[1, 2, 3, 4, 5].

For example, U.S. Pat. No. 4,039,651A[2] describes a closed-cycle multi-step process for the production of hydrogen and oxygen, in which an iron oxide is reacted in step one with hydrogen chloride or a mixture of hydrogen chloride and chlorine to form iron (II) chloride or iron (III) chloride and then in the next step iron or iron (II) oxide is reacted with water to form iron (II) oxide or iron (III) oxide, producing hydrogen and oxygen within a closed system. The reactions of this process take place at temperatures between 130° C. and 1100° C.

Furthermore, U.S. Pat. No. 3,842,164 describes a closed-cycle multi-step process for the formation of hydrogen and oxygen using Fe-Ha-H chemistry, wherein Ha is chlorine or bromine, wherein, for the purpose of hydrogen formation, ferrous chloride or ferrous bromide are used as starting substances.

The cyclic process described in U.S. Pat. No. 4,024,230 involves the production of hydrogen by decomposition of water, which is derived from inorganic iron compounds, particularly iron (II) chloride, iron (III) chloride or mixtures thereof, which are reduced to iron at temperatures of about 525° C. to 1300° C.

Also, the process described in U.S. Pat. No. 3,998,942, which is a closed-cycle process for the production of hydrogen and oxygen from water, in which iron chloride is formed from iron ion-containing oxide by reaction with a substance containing chloride ion, does not utilize reactions of metallic iron with HCl to produce hydrogen at room temperature.

None of the above[1, 2, 3, 4, 5] iron chloride cycles exploit the reaction of metallic iron with an aqueous HCl solution, in which hydrogen is released at room temperature, in combination with subsequent thermal regeneration of the resulting $FeCl_2$ solution via Fe-oxide, hydroxide or oxohydroxide species back to metallic iron.

A reaction of metallic iron with an aqueous HCl solution, in which hydrogen is released at room temperature, has been used in the technology for storing electrical energy in solid matter, which is described in patent SI 25573A[6]. The reaction is integrated into the material flow in combination with a completely different regeneration of the resulting metal chloride solution as described by the present invention. Regeneration in the technology for storing electrical energy in solid matter is based on the electrolysis of this solution, resulting in not only a different input energy source, but a completely different chemistry of the entire material flow. In the case of storage of electrical energy in a solid matter, elemental metal and gaseous chlorine are formed on the electrodes during the electrolysis of a metal chloride solution, which chlorine must be converted into an HCl solution by reaction with water. In the case of the technical solution according to the present invention, thermal energy is used to convert metal chloride into elemental metal through an intermediate formation of metal oxide species. This material cycle does not include a reaction between chlorine gas and water, but a direct dissolution of hydrogen chloride gas in water.

DESCRIPTION OF TECHNICAL SOLUTION WITH EMBODIMENTS

The present invention relates to a process, which is a closed-cycle technological material flow, carried out by means of use of thermal energy and enables the production of hydrogen at room temperature on the basis of a solid energy carrier represented by metals M as defined in the present invention hereinafter. The process according to the invention comprises three main technological segments:

oxidation segment i, in which the oxidation of a metal M is carried out, wherein hydrogen is released, regeneration segment ii, in which the reduction of ions of the metal M is carried out for the regeneration of the metal M, and segment iii of capturing gaseous HCl, in which gaseous HCl is dissolved in water.

Individual segments of the process according to the invention are already known and have been described per se, but never together in a technologically closed cycle and for the purpose as described by the present invention. Individual segments per se are not the subject of the present invention.

Hydrogen is released by reacting a metal with an aqueous HCl solution in the oxidation segment i of the process of the invention, which includes step one 1 of the process. During this chemical reaction, the oxidation state of the metal increases and the metal transitions to the ion state. The reaction product hydrogen gas is formed, which is a high-calorie fuel, and a metal chloride aqueous solution. Hydrogen can be converted immediately, without a need for intermediate storage, into heat or electrical energy by already known processes which are not the subject of this patent protection. In addition to hydrogen gas, a metal chloride aqueous solution is formed in this segment, which is regenerated in the next technological regeneration segment ii.

In the regeneration segment ii of the process according to the invention, the regeneration of the formed metal ions in the chloride solution is carried out by reducing the oxidation state of the metal ions by heat treatment. Liquid water is first removed from the solution in step two 2 of the process (e.g. by evaporation), which causes crystallization of the chloride salt or metal chloride hydrate. (The term metal chloride hydrate refers to a metal chloride with bound crystal water.) Metal ions in a higher oxidation state are present in the salt. In step three 3 of the process, which is step one of heat treatment, metal chloride salts or hydrates of metal chlorides (metal chloride with bound crystal water) are converted into metal oxide, oxohydroxide or hydroxide species in air. These are then in step five 5, which is step two of heat treatment, applying established metallurgical processes that are specific to various elements and known by a person skilled in the art of known devices or systems, converted to elemental metals in the reduction process. These metals are re-used in the next production cycle to produce hydrogen. The production cycle can be repeated one or more times.

The third technological segment iii of the process, which includes step four 4 of the process, represents capturing gaseous HCl, which is released in step one of heat treatment of metal chloride or metal chloride hydrate. The released gaseous HCl is captured by dissolving in water, where already known commercial technologies can be applied. This recovers the HCl solution which is used in the oxidation segment i of the process according to the invention.

As the heat required in the regeneration segment ii for the evaporation of water from the chloride solution and/or for step one of heat treatment, the thermal energy obtained from conventional sources is used; thermal energy obtained from various renewable sources can also be used.

The process according to the invention is characterized in that the heat required for the evaporation of water from the chloride solution and for step one of heat treatment can be obtained from various renewable sources, namely geothermal and solar thermal energy can be used as well as industrial excess heat (e. g. from cement plants, heating plants or power plants) or any combination thereof. In addition, heat recovery processes can be integrated into the technology, which will reduce the energy input and thus the cost required to regenerate the solution.

The process according to the invention will be described in the following and presented in the drawings, in which:

FIG. 1: A general scheme of the process according to the invention represents a cyclic technological process of hydrogen production based on a reaction of a metal and HCl with steps: step one 1 which is the oxidation of a metal M with a hydrochloric acid solution, step two 2 which is crystallization, step three 3 which is step one of heat treatment (low-temperature heat treatment), step four 4 which is the dissolution of gaseous HCl, step five 5 which is step two of heat treatment (high-temperature heat treatment).

Figure 2:
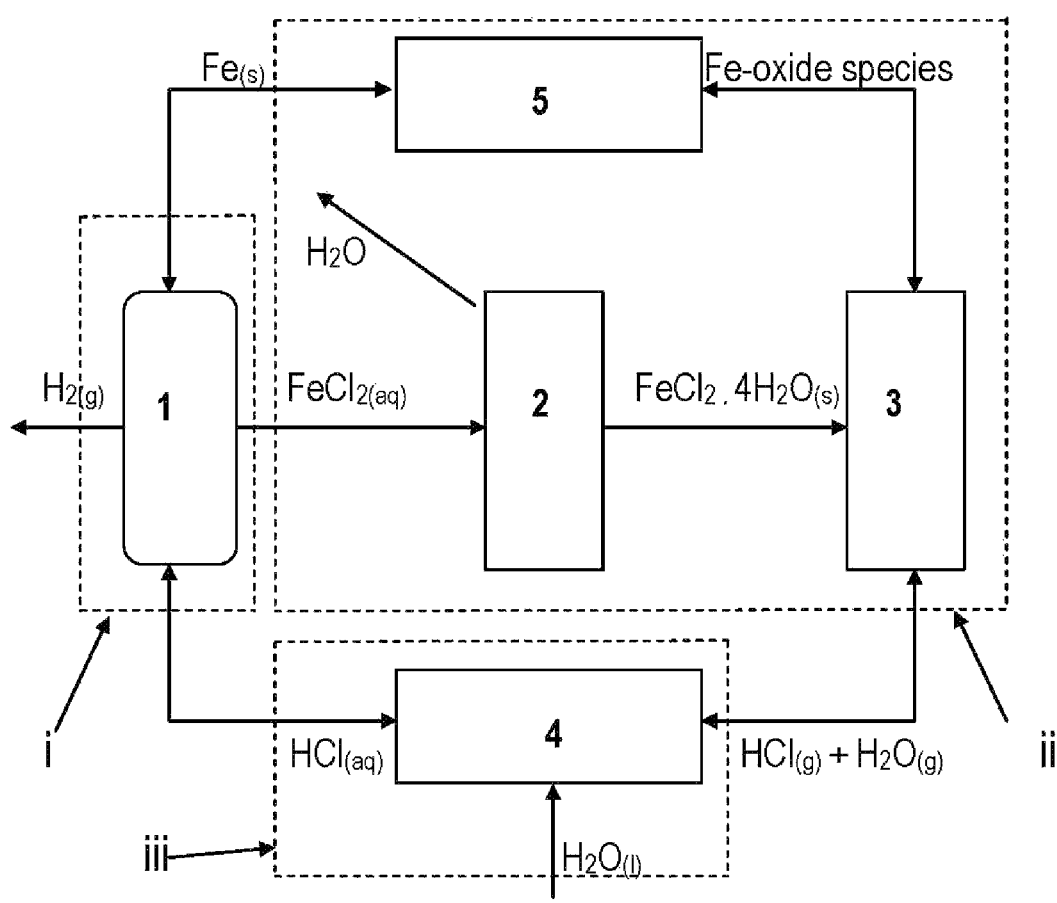

FIG. 2: A scheme of the process according to the invention represents a material flow and a cyclic technological process of hydrogen production based on a reaction of iron and HCl with an example of a three-step treatment of a $FeCl_2$ solution in the regeneration segment ii of the process: step two 2 which is crystallization, step three 3 which is low temperature heat treatment of $FeCl_2 \cdot 4H_2O$, and step five 5 which is high-temperature heat conversion of Fe-oxide species to elementary iron (g denotes gas, l denotes liquid, s denotes solid matter and aq denotes aqueous solution).

Figure 3:
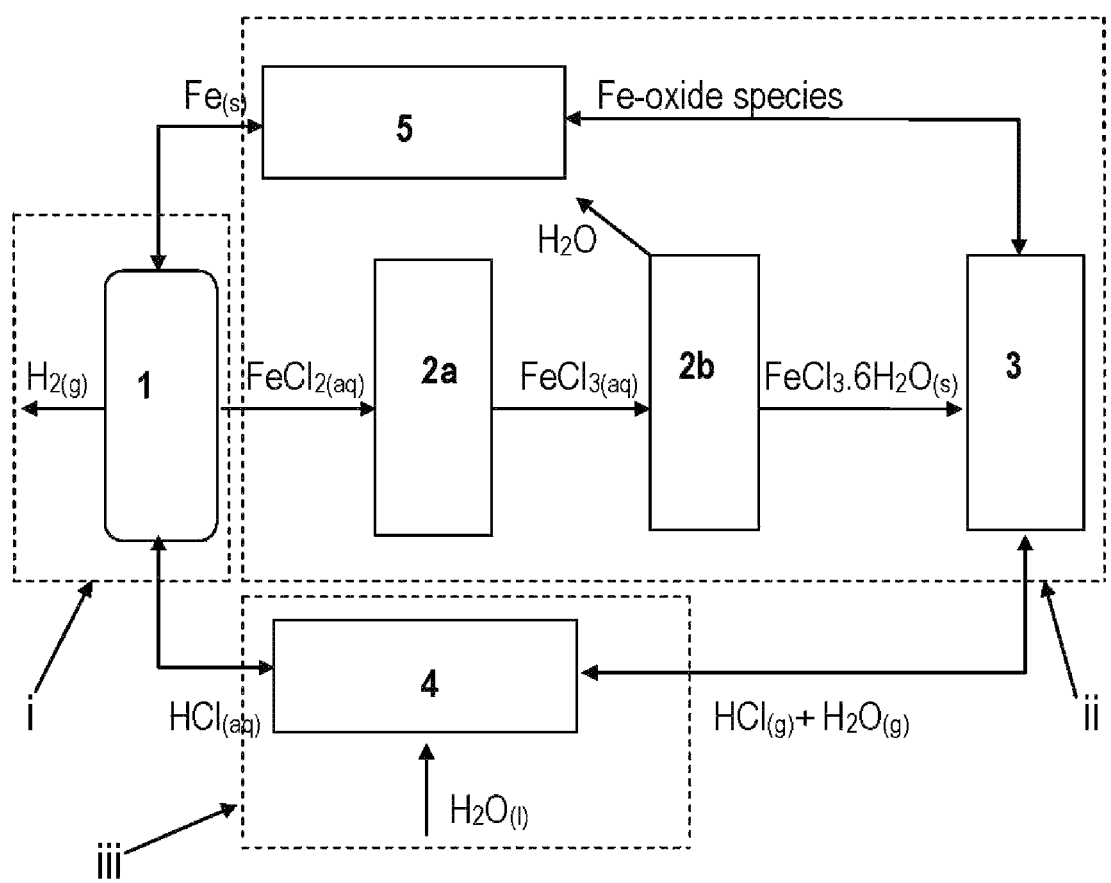

FIG. 3: A scheme of the process according to the invention represents a material flow and a cyclic technological process of hydrogen production based on a reaction of iron and HCl with an example of a four-step treatment of a $FeCl_2$ solution in the regeneration segment ii of the process: oxidation sub-step 2a which is oxidation of $FeCl_2$ to $FeCl_2$, crystallization sub-step 2b which is crystallization, step three 3 which is low-temperature heat treatment of $FeCl_3 \cdot 6H_2O$, and step five 5 which is high-temperature heat conversion of Fe-oxide species to elementary iron.

Wherever they appear in this text, the designations denote: g denotes gas, l denotes liquid, s denotes solid matter and aq denotes aqueous solution.

The cyclic technological process according to the invention is a multi-step process comprising the following steps: step one 1, in which hydrogen is released in a hydrogen-release reaction vessel, step two 2 which is crystallization in a crystallization unit, step three 3 which is step one of heat treatment (low-temperature heat treatment), step four 4 which is the dissolution of gaseous HCl in a system for dissolving gaseous HCl in water, and step five 5 which is step two of heat treatment (high-temperature treatment, metallurgical process). The crystallization unit may, if necessary, be divided into an oxidation subunit in which oxidation sub-step 2a takes place, and a crystallization subunit, in which crystallization sub-step 2b is carried out, depending on the chemical properties of the metal chloride.

In the oxidation segment i in step one 1, a chemical reaction takes place in the hydrogen-release reaction vessel, in which hydrogen is formed at room temperature. The chemical reaction occurs between the HCl solution and a metal M following the reaction:

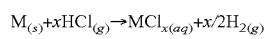

$$M_{(s)} + xHCl_{(g)} \rightarrow MCl_{x(aq)} + x/2 H_{2(g)}$$

To reach a good yield of the process according to the invention, it is important that this reaction is thermodynamically spontaneous, which means that the free Gibbs energy decreases during the reaction. Thus, no additional energy is required for the reaction to take place and the reaction can proceed at room temperature. The reaction releases heat which can be recovered in the heat recuperator and fed to the processes requiring heat, in particular to the crystallization process in step two 2 and to step one of the heat treatment in step three 3. The reactions relevant to this technological process have already been described and also thermodynamically evaluated, but never used in the cyclic material flow which is the subject of this patent protection.

The term metal M, referred to hereinbefore and hereinafter, represents elemental metals, their alloys, their intermetallic compounds or multi-elemental metals.

Preferably, the process uses a metal M selected from the group consisting of elemental metals selected from Fe, Zn, Sn, Al or Mg, mutual alloys of these metals, preferably Zn—Fe alloys, intermetallic compounds of these metals, preferably $Fe_3Zn_{10}$, $FeZn_7$, $Fe_5Sn_3$, FeSn, and multi-element metals containing a major proportion of said elemental metals.

Particularly preferably, in the process according to the invention, elemental iron (Fe) or an iron alloy or an intermetallic metal with iron or a multi-element metal containing a predominant iron content is used as the metal M. Elemental iron is particularly preferred.

The metal ions from the chloride solution, which is the product of the reaction between a metal and HCl in step one 1, must be regenerated into elemental metal for a complete material flow. The first step is the crystallization of metal chloride, which represents step two 2 of the process according to the invention. This process is carried out in an industrial crystallizer, where water is evaporated, which causes the crystallization of a metal chloride (e.g. $MCl_x$) or a metal chloride hydrate (e.g. $MCl_x \cdot yH_2O$). The process of oxidation of metal ions can be included in this technological segment of the process before the step of water evaporation in order to adapt the processes in subsequent heat treatment processes. In such a case, step two 2 of the process consists of two sub-steps, namely oxidation sub-step 2a, in which the oxidation process of metal ions takes place, and crystallization sub-step 2b, in which the crystallization process (water evaporation) takes place. The oxidation of metal ions in oxidation sub-step 2a can be carried out by an addition of oxidants, which can be in liquid or gaseous form. An oxidant in liquid form is e.g. hydrogen peroxide $H_2O_2$. Oxidation with an oxidant in gaseous form is carried out by purging a chloride solution with a gas, which may be, for example, oxygen or a gas mixture containing oxygen, or even air. The oxidation product is then taken to crystallization pre-step 2b, where water is evaporated to crystallize a metal chloride (with a higher oxidation state) or a hydrate of this metal chloride.

The crystallized metal chloride or its hydrate is heat-treated in a first low-temperature heat treatment step, which is step three 3. This treatment takes place in humid air and in most cases does not exceed a temperature of 550° C. At this stage of processing, chloride species are converted into oxide ones, which are suitable for further metallurgical processing in step five 5 of the process according to known processes and in devices or systems for obtaining metals from ores or minerals. The presence of humid air is important for the fact that during the fusion of chloride species, gaseous HCl is formed as much as possible, which is very soluble in water, instead of gaseous $Cl_2$. In step four 4 of the process, gaseous HCl is led to a system for dissolving in water (scrubber), where the HCl acid is formed, which is again needed in a new material cycle to react with a metal.

According to one embodiment of the present invention, the material cycle can be set out in a generalized form in steps:
(1) Hydrogen release: $M_{(s)} + xHCl_{(aq)} \rightarrow MCl_{x(aq)} + x/2 H_{2(g)}$
(2) Crystallization: $MCl_{x(aq)} \rightarrow MCl_x \cdot yH_2O_{(s)} + H_2O_{(g)}$
(3) Step one of heat treatment: $MCl_x \cdot yH_2O_{(s)} + H_2O_{(g)} \rightarrow$ M-oxide species+$HCl_{(g)}$ (4) Regeneration of HCl acid: $HCl_{(g)} + H_2O \rightarrow HCl_{(aq)}$
(5) Step two of heat treatment: M-oxide species (+reducing agent)→elemental M+oxygen (or a reducing agent oxide)

According to a further embodiment of the invention, the crystallization step, which is step two 2 of the process, can take place in two sub-steps, where the oxidation of metal ions takes place in the first oxidation sub-step 2a, followed by the crystallization sub-step 2b of crystallization. The oxidation of metal ions can be carried out by adding liquid oxidants, such as hydrogen peroxide $H_2O_2$, or by purging a gas, which can be, for example, oxygen, a gas mixture containing oxygen, or even air.

In the material cycle, the amount of metal and chloride ions remains unchanged, as these components are not consumed, but only circulate through the technological cycle. For these components, the material cycle is closed. Only water enters the cycle while oxygen and hydrogen exit it.

EXAMPLES

The following are two examples of the processes according to the invention, in which hydrogen is released during the reaction of iron with an HCl solution. Examples of two variants of such a process according to the invention are shown in FIGS. 2 and 3. In both cases, hydrogen is released in the reaction vessel during the reaction between Fe and the HCl solution, which can be described by the equation:

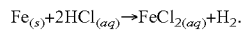

The reaction produces the same number of moles of hydrogen as the moles of iron used. The reaction is thermodynamically spontaneous and proceeds entirely at room temperature. The reaction releases heat which can be recovered in the heat recuperator and fed to the processes requiring heat. The reaction also produces an $FeCl_2$ solution, which must be converted back to HCl and elemental iron in further technological steps.

Example 1

In the variant of the process according to the invention shown in FIG. 2, in step two 2, which is crystallization, the water from $FeCl_2$ is evaporated. The ferrous chloride hydrate $FeCl_2 \cdot 4H_2O_{(s)}$ crystallizes. Various heat sources can be used for water evaporation, but it makes economic sense to use renewable sources, such as geothermal or solar heat or excess industrial heat. In a further step three 3 of the process, $FeCl_2 \cdot 4H_2O_{(s)}$ is heat treated at about 550° C. in humid air, leading to the digestion of chloride, the formation of Fe-oxide species, which can be oxides, hydroxides and oxohydroxides, and the gaseous HCl. In the case of complete oxidation, the following reaction takes place:

Then, in the next step five 5 of the process, the Fe-oxide species are converted back to elemental iron in the blast furnaces following a metallurgical process, and the conversion produces oxygen or a reducing agent oxide (e.g. $H_2O$ or $CO_2$). The resulting gaseous HCl is dissolved in water in step four 4 of the process in commercial scrubbers to re-form HCl acid, which is fed to the oxidation segment i to be reused for reaction with iron, or can be stored in appropriate re-use tanks for use in a reaction with iron in a new technological cycle.

Example 2

In the variant of the process according to the invention shown in FIG. 3, step two 2, crystallization, is divided into two sub-steps 2a and 2b, which take place in two subunits. In the first oxidation sub-step 2a, $Fe^{2+}$ ions of the chloride solution are oxidized to $Fe^{3+}$ ions in the oxidation subunit. This can be achieved by adding oxidants, such as hydrogen peroxide $H_2O_2$, or by purging a gas, which can be, for example, oxygen, a gas mixture containing oxygen, or even air. In the case of oxidation with oxygen in the presence of a sufficient quantity of chloride ions, the following reaction takes place:

$$12FeCl_{2(aq)} + 3O_{2(g)} + 12HCl_{(aq)} \rightarrow 12FeCl_{3(aq)} + 6H_2O$$

and in the absence of excess chloride ions $$6FeCl_{2(aq)} + 3O_{2(g)} \rightarrow 2FeCl_{3(aq)} + 2Fe_2O_{3(s)}.$$

$Fe_2O_3$ precipitates as early as this phase. After oxidation, the whole product is taken to the second crystallization sub-step 2b, where water is evaporated in the second crystallization subunit to crystallize $FeCl_3 \cdot 6H_2O_{(s)}$, too. In a further step three 3 of the process, $FeCl_3 \cdot 6H_2O_{(s)}$ (together with $Fe_2O_3$) is heat treated at about 500° C. in humid air, leading to the digestion of chloride, the formation of Fe-oxide and the gaseous HCl according to the equation $2FeCl_3 \cdot 6H_2O \rightarrow Fe_2O_3 + 6HCl + 8H_2O$. In the next step five 5 of the process, the Fe-oxide is converted back to elemental iron following a metallurgical process in blast furnaces. The HCl is dissolved in water in step four 4 of the process in commercial scrubbers to re-form HCl acid, which can be stored and re-used in a reaction with iron in a new technological cycle.

The present invention is not obvious in relation to prior art and is innovative as it introduces, into the technological cycle of hydrogen production by means of thermal energy, processes which have not been described so far:
  release of hydrogen based on a reaction that takes place at room temperature,
  new material flow chemistry based on oxidation-reduction conversion of metal chlorides, and
  use of thermal energy to drive chemical processes in the material cycle to produce hydrogen.

The present invention is useful in enabling environmentally sustainable, carbon-free hydrogen production. As an energy source, it allows the use of sustainable heat sources such as geothermal heat or solar heat, as well as the use of excess industrial heat. The material cycle is closed, there are no emissions or waste. Only water enters the process while hydrogen and oxygen exit it, so such production of hydrogen is environmentally neutral from the point of view of raw material consumption.

LITERATURE

[1] Cristian Canavesio, Horacio E. Nassini, Ana E. Boh, Evaluation of an iron-chlorine thermochemical cycle for hydrogen production, Int. J. Hydrogen Production, 40 (2015), 8620-8632
[2] Karl-Friedrich Knoche, Johannes Schubert, Roland Schulze-Bentrop, Process for closed-cycle thermochemical production of hydrogen and oxygen from water, U.S. Pat. No. 4,039,651A (1977)
[3] R Wentorf, Closed-cycle thermochemical production of hydrogen and oxygen, U.S. Pat. No. 3,842,164A (1974)
[4] Karl-Friedrich Knoche, Helmut Cremer, Gerhard Steinborn Producing hydrogen and oxygen by decomposition of water via the thermochemical iron-chlorine system, U.S. Pat. No. 4,024,230A (1977)
[5] Jon B. Pangborn, John C. Sharer, Robert H. Elkins, Process for producing hydrogen and oxygen from water, U.S. Pat. No. 3,998,942A (1976)
[6] Matjaz Valant, Method for storing electrical energy in solid matter, patent no. SI25573A (2017)

The invention claimed is:
1. A process for the production of hydrogen, comprising:
an oxidation segment (i) including step one (1) of the process, in which, in a hydrogen-release reaction vessel, oxidation of a metal M, wherein the metal M is selected from a group consisting of elemental metals selected from Fe, Zn, Sn, Al, or Mg, mutual alloys of the elemental metals, intermetallic compounds of the elemental metals, and multi-element metals containing a major proportion of said elemental metals, is carried out with a hydrochloric acid solution at room temperature, resulting in the production of hydrogen gas and a metal-chloride salt solution;
a regeneration segment (ii), in which reduction of metal ions is carried out for the regeneration of a metal M, comprising step two (2) which is crystallization in a crystallization unit, step three (3) which is step one of heat treatment in a system for step one of heat treatment, and step five (5) which is step two of heat treatment in the system for step two of heat treatment, and wherein the regeneration of the metal ions in the chloride solution, formed in the oxidation segment (i), is carried out by reducing the oxidation state of the metal ions by heat treatment,
in which in step two (2) which is crystallization, liquid water is evaporated causing the crystallization of the metal-chloride salt or the metal chloride hydrate, and then in step three (3), which is step one of heat treatment, a metal chloride salt or metal chloride hydrate is converted into metal oxide, metal oxyhydroxide or metal hydroxide species in air,
which are then in step five (5) which is step two of heat treatment, in the reduction process, converted to elemental metal, wherein oxygen or reducing agent oxide is formed, and the obtained elemental metal is reintroduced to the oxidation segment (i) of the process; and
a segment (iii) of capturing gaseous HCl, in which in step four (4) of the process, in the system for dissolving gaseous HCl in water, the gaseous HCl released in step one of heat treatment of metal chloride is dissolved in water, wherein an aqueous HCl solution is obtained which is led for re-use to the oxidation segment (i) of the process or stored in suitable tanks for re-use in the oxidation segment (i),
wherein individual segments of the process can be repeated once or several times.
2. The process according to any claim 1, wherein in the oxidation segment (i) in step one (1) of the process, in a hydrogen-release reaction vessel, oxidation of elemental iron (Fe) is carried out with a hydrochloric acid (HCl) solution at room temperature, resulting in the production of hydrogen gas and a metal chloride solution $(FeCl_{2(aq)})$, followed by the regeneration segment (ii) of the process, in which in step two (2), which is crystallization, liquid water is evaporated in the crystallization unit from an $FeCl_2$ solution, such that ferrous chloride hydrate $(FeCl_2 \cdot 4H_2O_{(s)})$ is crystallized, followed by step three (3), which is step one of heat treatment, in which the resulting $(FeCl_2 \cdot 4H_2O_{(s)})$ is heat-treated at about 550° C. in humid air, resulting in the digestion of chloride and the formation of gaseous HCl and Fe-oxide species, which can be oxides, hydroxides and oxohydroxides, which are then converted into elemental iron in the subsequent step five (5), which is step two of heat treatment, in the reduction process following the metallurgical process in blast furnaces, wherein oxygen and reducing agent oxide are formed, in segment (iii) of capturing gaseous HCl in water, the resulting gaseous HCl is dissolved in water in step four (4) in the system for dissolving the gaseous HCl in water, wherein hydrochloric acid is formed which is re-used in the reaction with iron in the oxidation segment (i) of a new technological cycle, or the hydrochloric acid is optionally stored in an appropriate storage tank for re-use in a reaction with iron in the oxidation segment (i) of a new technological cycle.

3. The process of claim 2 wherein, in the regeneration segment (ii), step two (2), which is crystallization, comprises an oxidation sub-step (2a) and a crystallization sub-step (2b), wherein in the oxidation sub-step (2a), in the oxidation subunit, the $Fe^{2+}$ ions of the chloride solution are oxidized to $Fe^{3+}$ ions by adding oxidants which may be in liquid or gaseous form and selected from a group consisting of liquid hydrogen peroxide, oxygen gas, an oxygen-containing gas mixture and air, wherein, optionally, in the case of oxidation with oxygen from $FeCl_{2(aq)}$ in the presence of a sufficient quantity of chloride ions, a reaction takes place, in which $FeCl_{3(aq)}$ and water are formed, or in the absence of excess chloride ions a reaction takes place, in which $FeCl_{3(aq)}$ and $Fe_2O_{3(s)}$ are formed, the resulting product mixture is passed to the crystallization subunit after the oxidation step, where water is evaporated in the crystallization sub-step (2b) to crystallize $FeCl_3 \cdot 6H_2O_{(s)}$, followed by step three (3) of the process in which $FeCl_3 \cdot 6H_2O_{(s)}$ together with $Fe_2O_3$ is heat treated at about 500° C. in humid air, which leads to the digestion of chloride and the formation of Fe-oxide and gaseous HCl, and in the subsequent step five (5) of step two of heat treatment Fe-oxide, following a metallurgical process in blast furnaces, is converted back into elemental iron, producing oxygen or reducing agent oxide, the resulting gaseous HCl, in segment (iii) of the process, in step four (4) in the system for dissolving the gaseous HCl in water, is dissolved in water, wherein hydrochloric acid is formed which is re-used in the reaction with iron in the oxidation segment (i) of a new technological cycle, or the hydrochloric acid is optionally stored in an appropriate storage tank for re-use in a reaction with iron in the oxidation segment (i) of a new technological cycle.

4. The process according to claim 2, wherein the heat supplied to the regeneration segment (ii) of the process in step two (2) which is crystallization and/or crystallization sub-step (2b) which is crystallization and step three (3) which is step one of heat treatment, is obtained from conventional sources or renewable sources, the supplied heat energy being selected from renewable sources and selected from a group consisting of geothermal heat energy, solar heat energy, industrial excess heat or heat obtained from the processes of heat recuperation, or any combination thereof.

5. The process according to claim 1, wherein the heat needed in the regeneration segment (ii) of the process in step two (2) which is crystallization and/or step three (3) which is step one of heat treatment, is obtained from conventional sources or renewable sources or a combination thereof, wherein the heat energy obtained from renewable sources is selected from a group consisting of geothermal heat energy, solar heat energy, industrial excess heat or heat obtained from the processes of heat recuperation, or any combination thereof.

6. The process according to claim 5, wherein the heat needed in the regeneration segment (ii) of the process in step two (2) which is crystallization and/or step three (3) which is step one of heat treatment, is obtained from renewable sources, the heat energy being selected from a group consisting of geothermal heat energy, solar heat energy, industrial excess heat or heat obtained from the processes of heat recuperation, or any combination thereof.

7. The process according to claim 1, wherein step two (2), which is crystallization, comprises an oxidation sub-step (2a) that is carried out in an oxidation subunit, in which metal ions are oxidized by adding oxidants, and a crystallization sub-step (2b) in which a metallic chloride or a metallic chloride hydrate is crystallized.

8. The process according to claim 7, wherein the oxidant used for the oxidation of the metal ions in the chloride solution in oxidation sub-step (2a) is in liquid or gaseous form, wherein hydrogen peroxide is added as the oxidant in liquid form, or oxygen or a gas mixture containing oxygen or air is added as oxidant in gaseous form, and wherein the gaseous oxidant is added by purging the chloride solution with oxygen or a gas mixture containing oxygen, or air, the oxidation of metal ions in the chloride solution is carried out by purging the solution with air.

9. The process according to claim 1, wherein the mutual alloys of the elemental metals are Zn—Fe alloys, intermetallic compounds of the elemental metals are $Fe_3Zn_{10}$, $FeZn_7$, $Fe_5Sn_3$, FeSn, and multi-element metals containing a major proportion of said elemental metals.

10. The process according to claim 1, wherein a metal M is elemental iron or an iron alloy or an intermetallic metal with iron or a multi-element metal containing a predominant content of iron.

11. The process according to claim 1, wherein the heat released in the reaction between the metal M and the HCl solution in the oxidation segment (i) in step one (1) of the process is recovered in a heat recuperator and the heat thus obtained is fed into the crystallization process to step two (2) of the process and/or to the crystallization sub-step (2b) of the process and/or step three (3) which is step one of heat treatment.

12. The process according to claim 1, wherein step three (3) which is step one of heat treatment, is carried out in humid air and at a temperature identical to or lower than 550° C.

13. Process according to claim 1, wherein only water enters the process while hydrogen and oxygen exit, and the amount of metal and chloride ions remains unchanged, and that the process produces the same number of moles of hydrogen as the moles of metal used, preferably iron.

14. Process according to claim 1, wherein the hydrogen formed in the oxidation segment (i) is immediately, without intermediate storage, converted into heat or electricity.

* * * * *